(12) United States Patent
Filsfils et al.

(10) Patent No.: US 8,908,517 B2
(45) Date of Patent: Dec. 9, 2014

(54) TRAFFIC DISTRIBUTION ACROSS A PLURALITY OF ATTACHMENT CIRCUITS OF A MULTIHOME SITE WITH A COMPUTER NETWORK USING HASHING ALGORITHM

(75) Inventors: Clarence Filsfils, Brussels (BE); Pradosh Mohapatra, Fremont, CA (US); Sami Boutros, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 877 days.

(21) Appl. No.: 13/045,408

(22) Filed: Mar. 10, 2011

(65) Prior Publication Data

US 2012/0230335 A1    Sep. 13, 2012

(51) Int. Cl.
*H04L 1/00* (2006.01)
*H04L 12/721* (2013.01)
*H04L 12/743* (2013.01)

(52) U.S. Cl.
CPC ............ *H04L 45/38* (2013.01); *H04L 45/7453* (2013.01)
USPC ........... 370/235; 370/351; 370/386; 370/392; 370/395.31

(58) Field of Classification Search
None
See application file for complete search history.

(56) References Cited

U.S. PATENT DOCUMENTS

| | | | |
|---|---|---|---|
| 6,553,029 B1 * | 4/2003 | Alexander | 370/389 |
| 7,042,834 B1 | 5/2006 | Savage | |
| 7,042,838 B1 | 5/2006 | Shand et al. | |
| 7,099,325 B1 * | 8/2006 | Kaniz et al. | 370/392 |
| 7,292,573 B2 * | 11/2007 | LaVigne et al. | 370/390 |
| 7,424,016 B2 * | 9/2008 | Sweeney et al. | 370/389 |
| 7,535,828 B2 | 5/2009 | Raszuk et al. | |
| 7,536,693 B1 * | 5/2009 | Manczak et al. | 718/105 |
| 7,609,619 B2 | 10/2009 | Naseh et al. | |
| 7,619,982 B2 | 11/2009 | Blair et al. | |
| 7,623,455 B2 * | 11/2009 | Hilla et al. | 370/232 |
| 7,643,409 B2 | 1/2010 | Voit et al. | |
| 7,675,918 B2 | 3/2010 | Charny et al. | |
| 7,706,281 B2 | 4/2010 | Dalal et al. | |
| 7,710,902 B2 | 5/2010 | Vasseur et al. | |
| 7,751,399 B2 * | 7/2010 | Martini et al. | 370/392 |
| 7,769,886 B2 | 8/2010 | Naseh et al. | |
| 7,778,199 B2 | 8/2010 | Booth, III et al. | |

(Continued)

OTHER PUBLICATIONS

Kompella, et al., Virtual Private LAN Service (VPLS) Using BGP for Auto-Discovery and Signaling, Network Working Group, IEFT, Request for Comments 4761, Jan. 2007, 28 pages.

*Primary Examiner* — Ayaz Sheikh
*Assistant Examiner* — Faiyazkhan Ghafoerkhan
(74) *Attorney, Agent, or Firm* — Novak Druce Connolly Bove + Quigg LLP

(57) ABSTRACT

In one embodiment, an edge device of a core network may receive a plurality of packets from a peripheral network having a plurality of active connections to the core network, where each packet has a destination address and a source address. The edge device may compute a hash on the destination address or the source address of each packet, and determine whether the computed hash corresponds to the edge device. In response to the computed hash not corresponding to the edge device, the edge device may drop the packet, and in response to the computed hash corresponding to the edge device, the edge device may process the packet to forward the packet, where the dropping and processing load balances the plurality of packets over the active connections and prevents formation of loops in the core network.

18 Claims, 19 Drawing Sheets

(56) References Cited

U.S. PATENT DOCUMENTS

| | | | |
|---|---|---|---|
| 7,782,841 B2 | 8/2010 | Rampal et al. | |
| 7,801,030 B1 | 9/2010 | Aggarwal et al. | |
| 7,809,009 B2 | 10/2010 | Tatar et al. | |
| 7,813,350 B2 | 10/2010 | Singh et al. | |
| 7,844,731 B1 * | 11/2010 | Zhou | 709/238 |
| 7,990,971 B2 * | 8/2011 | Ra et al. | 370/392 |
| 8,274,980 B2 * | 9/2012 | Sato et al. | 370/392 |
| 8,442,006 B2 * | 5/2013 | Haddad et al. | 370/331 |
| 2004/0068589 A1 * | 4/2004 | Witkowski et al. | 709/249 |
| 2004/0240447 A1 * | 12/2004 | Dorbolo et al. | 370/392 |
| 2004/0254909 A1 | 12/2004 | Testa | |
| 2005/0114522 A1 * | 5/2005 | LaVigne et al. | 709/228 |
| 2005/0220092 A1 * | 10/2005 | LaVigne et al. | 370/389 |
| 2006/0047851 A1 | 3/2006 | Voit et al. | |
| 2006/0101039 A1 | 5/2006 | Huber | |
| 2006/0117058 A1 * | 6/2006 | Smith | 707/102 |
| 2006/0245436 A1 * | 11/2006 | Sajassi | 370/395.53 |
| 2007/0008982 A1 | 1/2007 | Voit et al. | |
| 2007/0248062 A1 | 10/2007 | Leung et al. | |
| 2008/0112323 A1 * | 5/2008 | Agmon et al. | 370/235 |
| 2008/0205387 A1 * | 8/2008 | Wakumoto | 370/389 |
| 2009/0037491 A1 * | 2/2009 | Cachin et al. | 707/201 |
| 2009/0046734 A1 * | 2/2009 | Cheriton et al. | 370/412 |
| 2009/0190474 A1 | 7/2009 | Gahm et al. | |
| 2009/0193105 A1 | 7/2009 | Charny et al. | |
| 2010/0008363 A1 * | 1/2010 | Ee et al. | 370/392 |
| 2010/0211775 A1 * | 8/2010 | Vogt | 713/163 |
| 2010/0215042 A1 * | 8/2010 | Sato et al. | 370/392 |
| 2011/0273987 A1 * | 11/2011 | Schlansker et al. | 370/235 |
| 2012/0026878 A1 * | 2/2012 | Scaglione | 370/235 |
| 2013/0077492 A1 * | 3/2013 | Scaglione | 370/235 |

* cited by examiner

DATAPLANE STRUCTURE and FORWARDING
L2 FIB Table at PE3, Packet coming from SITE3

TRAFFIC DISTRIBUTION ACROSS A PLURALITY OF ATTACHMENT CIRCUITS OF A MULTIHOME SITE WITH A COMPUTER NETWORK USING HASHING ALGORITHM

TECHNICAL FIELD

The present disclosure relates generally to computer networks, and, more particularly, to multihomed sites.

BACKGROUND

When a site, such as a virtual private local area network (LAN) service (VPLS) site is multihomed to two or more provider edge (PE) routers in a service provider (SP) network, thus having a plurality of attachment circuits (ACs) between the site and the SP network, the site customers often seek a solution to utilize all the associated ACs simultaneously for forwarding traffic. Current multihoming technology focuses on preventing the formation of layer-2 loops in the SP's network by making one of the ACs active and the rest as redundant (i.e., used as an "active/standby" arrangement). This essentially utilizes only one AC as the active link in steady state for all traffic forwarding, and does not fully utilize the plurality of ACs to distribute, e.g., load balance, traffic into and out of the multihomed VPLS site.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
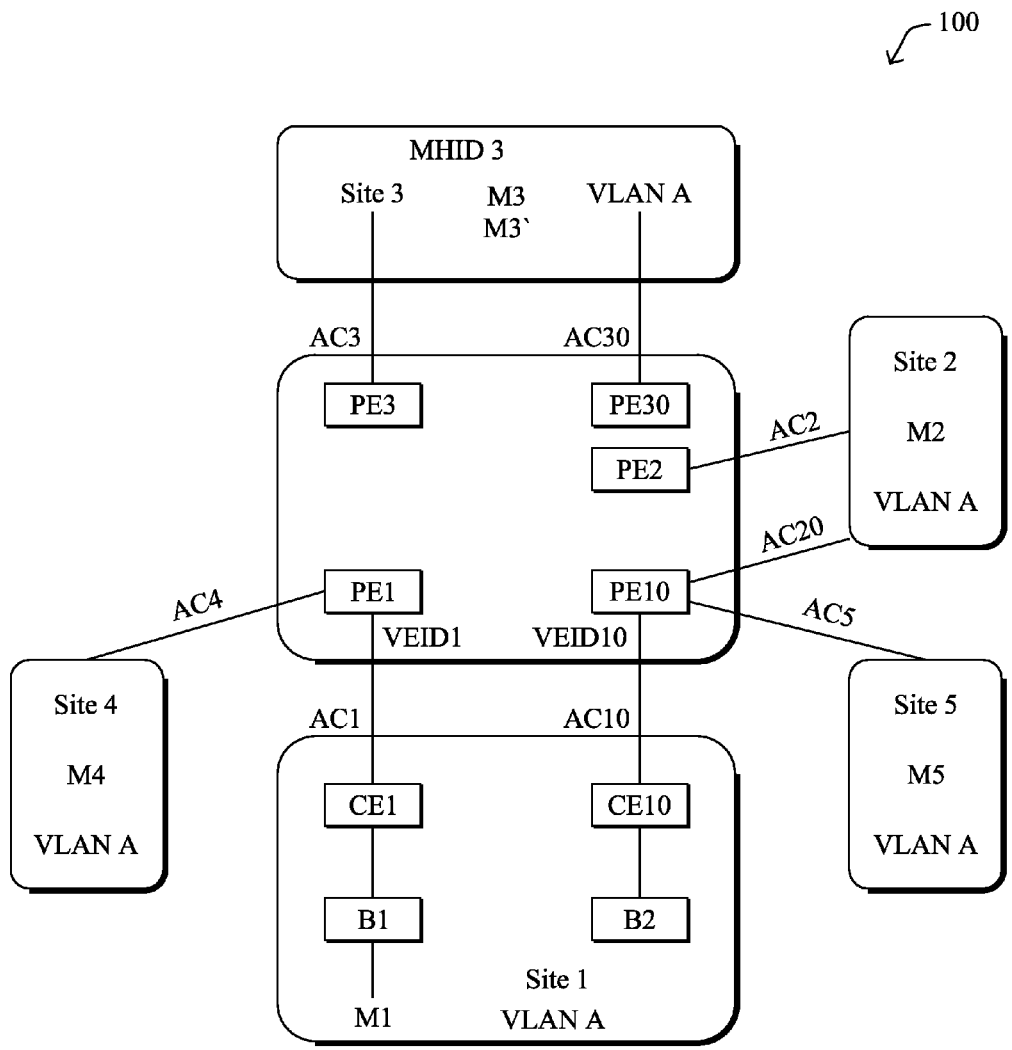
FIG. 1 illustrates an example computer network.

According to one or more embodiments of the disclosure, an edge device of a computer network may receive a packet (with source and destination addresses) from an active/active multihomed site. The receiving edge device may then compute a hash on the destination address or the source address, determine whether the computed hash corresponds to the receiving edge device, and based on whether the computed hash corresponds to the receiving edge device, may either drop or process the packet to forward it.

Also, according to one or more embodiments of the disclosure, processing the packet may entail performing a lookup operation into a media access control (MAC) table of the receiving edge device based on the destination address. In response to a match within the MAC table for the destination address that points to a set of virtual circuits to corresponding other edge devices, the receiving edge device may then compute a second hash on the other of the destination address and source address not already hashed, select a particular virtual circuit and corresponding particular edge device based on the computed second hash, and send the packet on the particular virtual circuit to the corresponding particular edge device, accordingly.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 1 is a schematic block diagram of an example computer network 100 illustratively comprising nodes/devices interconnected by links as shown. Illustratively, a plurality of peripheral networks or sites (e.g., virtual private LAN services, or "VPLS" sites) 1-5 are shown, each corresponding to an example virtual LAN (VLAN) "A." A core network, e.g., a service provider (SP) network interconnects the various peripheral networks (hereinafter customer sites 1-5). Each customer site may comprise one or more customer edge devices (CEs), specifically shown in site 1 as CE1 and CE10 (and hidden in the other sites). Also, the CEs of the customer networks connect to a provider edge device (PE) for access to the service provider network, e.g., over attachment circuits (ACs) numbered as shown. As described herein, certain sites, such as sites 4, and 5, are considered singlehomed (or singlehomed) sites, as they have a single connection to the central, core network. Other sites, however, such as sites 1 and 3, are considered multihomed (or multi-homed) sites, as they have a plurality of connections to the core network. (Note that often a multihomed site with exactly two connections or "attachment circuits" to the core network is often referred to as a dual-homed network.) Further, within each site may be one or more endpoints having an address, such as M1-M5, as shown and as used below. Those skilled in the art will understand that any number of nodes, devices, links, etc. may be used in the computer network, and that the view shown herein is for simplicity. Those skilled in the art will also understand that while the embodiments described herein are described with relation to service provider networks and related terms, they may apply to any suitable network configuration, and may occur within an Autonomous System (AS) or area, or throughout multiple ASes or areas, etc.

Data packets (e.g., traffic, messages, frames, etc.) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
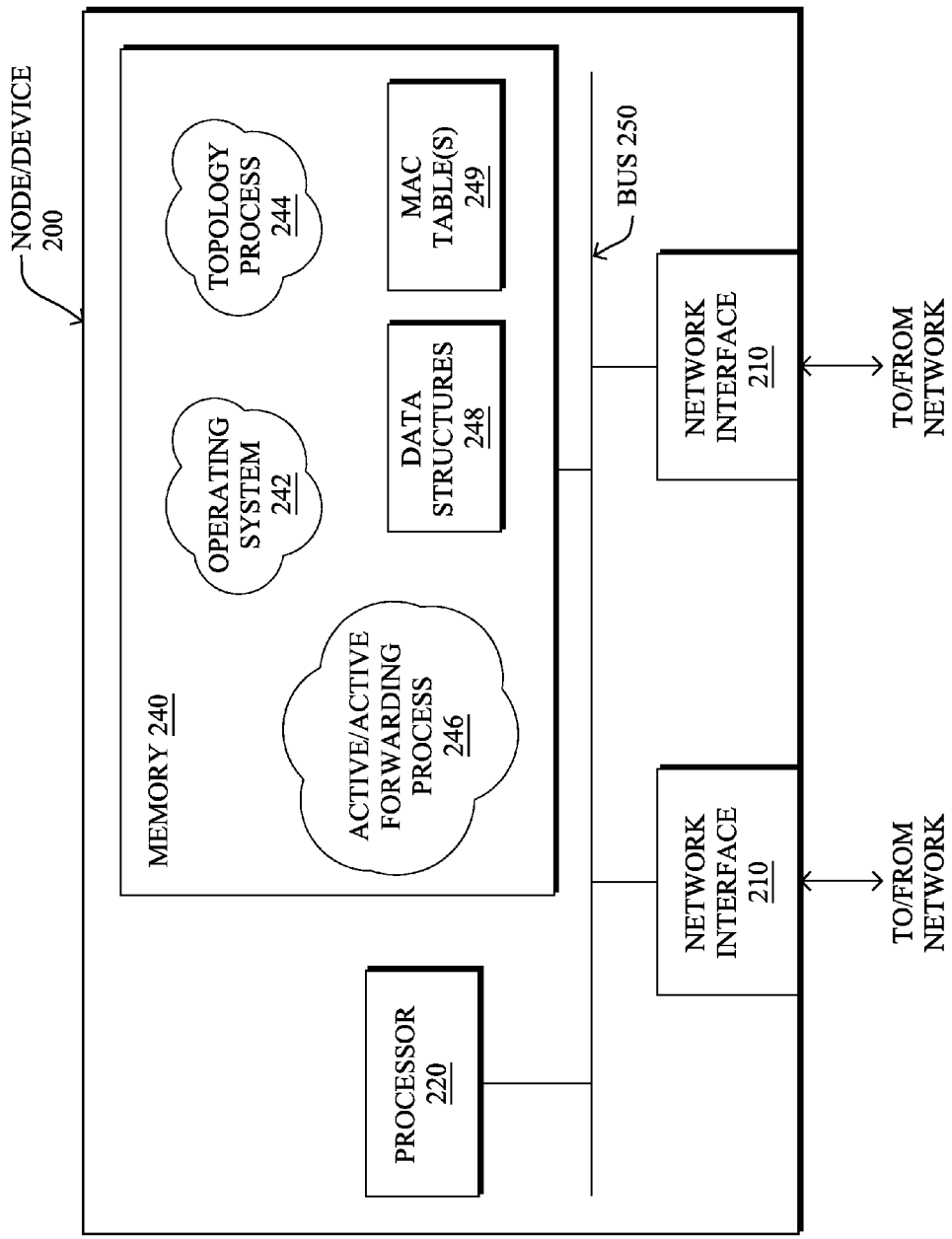
FIG. 2 illustrates an example network device/node.

FIG. 2 is a schematic block diagram of an example node/device 200 that may be used with one or more embodiments described herein, such as a network edge device (e.g., a PE of an active/active multihomed site, such as PE3, PE30, PE1, and/or PE10). The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100, particularly to active/active multihomed networks/sites or the core network (core-facing interfaces). The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art. Network interfaces 210 may illustratively be embodied as separate components, e.g., line cards (LCs), such that each component has its own responsibilities. For example, as described herein, a core component may communicate with one or more other network edge devices in a computer network, while an access component may communicate traffic with one or more specific sites (e.g., to endpoint devices via corresponding CEs).

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 248, such as a media access control (MAC) table 249. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise an illustrative topology process 244 and an active/active forwarding process 246, as described herein. It will be apparent to those skilled in the art that other types of processors and memory, including various computer-readable media, may be used to store and execute program instructions pertaining to the techniques described herein. Also, while the embodiments herein are described in terms of processes or services stored in memory, alternative embodiments also include the processes described herein being embodied as modules consisting of hardware, software, firmware, or combinations thereof.

Topology process 244 contains computer executable instructions executed by processor 220 to perform functions to maintain knowledge of the topology of network 100. For example, such functions may be provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database containing, e.g., data used to make forwarding decisions. For example, topology information may be learned and stored in MAC table 249, containing a list of destination MAC addresses and their corresponding forwarding information, as may be well understood by those skilled in the art. Notably, topology process 244 may also perform functions related to virtual routing protocols, such as maintaining VRF instances (not shown), or tunneling protocols, such as for Multi-Protocol Label Switching, etc., each as will be understood by those skilled in the art.

As noted above, when a customer site (e.g., VPLS site) is multihomed to two or more edge devices (e.g., PE routers) in a service provider network, the customers often seek a solution to utilize all the associated ACs simultaneously for forwarding traffic. Current multihoming technology focuses on preventing the formation of layer-2 loops in the SP's network by making one of the ACs active and the rest as redundant (i.e., used as an "active/standby" arrangement). This essentially utilizes only one AC as the active link in steady state for all traffic forwarding, and does not fully utilize the plurality of ACs to distribute, e.g., load balance, traffic into and out of the multihomed VPLS site. According to the embodiments herein, "active/active" forwarding techniques are described such that all ACs may be active, i.e., used to connect a multihomed site to a SP network while preventing formation of layer 2 loops at the same time.

Active/Active Multihoming

According to one or more embodiments of the disclosure, an edge device of a computer network may receive a packet (with source and destination addresses) from an active/active multihomed site. The receiving edge device may then compute a hash on the destination address or the source address, determine whether the computed hash corresponds to the receiving edge device, and based on whether the computed hash corresponds to the receiving edge device, may either drop or process the packet to forward it. Also, in one or more embodiments, if the packet is destined to another active/active multihomed site, the receiving edge device may also then compute a second hash on the other of the destination address and source address not already hashed, select a particular virtual circuit and corresponding particular edge device based on the computed second hash, and send the packet on the particular virtual circuit to the corresponding particular edge device, accordingly.

In other words, load-balancing across attachment circuits for a multihomed site may be restricted to a hash based, in one or more embodiments, on either the source or destination address of the packet, such that a remote address appears as only reachable via one single edge device. From the perspective of multihomed site 3 in FIG. 1, for example, the goal is to use both the connected attachment circuit (ACs) AC3 and AC30 (to/from PE3 and PE30, respectively) for an even load balancing. Similarly, for multihomed site 1, both AC1 and AC10 may be load-balanced (between CE1 and PE1 and CE10 and PE10, respectively). As described herein, one or more techniques may distribute destination addresses among the connected ACs of a multihomed site, e.g., packets destined to (or sourced from) a subset of MAC addresses use a first AC, whereas packets destined to (or sourced from) a different subset of MAC addresses use a second AC (and so on for more than dual-homed sites).

Illustratively, the techniques described herein may be performed by hardware, software, and/or firmware, such as in accordance with an active/active forwarding process 246, which may contain computer executable instructions executed by the processor 220 to perform functions relating to the novel techniques described herein, e.g., in conjunction with topology process 244 operating in a generally conventional manner.

Operationally, in addition to a standard virtual circuit (VC) label, PEs in the network may also allocate and exchange a second label to identify a) whether the packets originate from a single-homed site or multi-homed site and, if the packets originate from a multi-homed site, b) the site's multihomed identifier (MHID). As such, this label assists ingress PEs to associate MAC learning with a set of PEs that are attached to the multihomed site. Note that whether a site is multihomed, and thus whether a multihomed label is allocated, may be dynamically determined or locally configured (e.g., manually).

Figure 3:
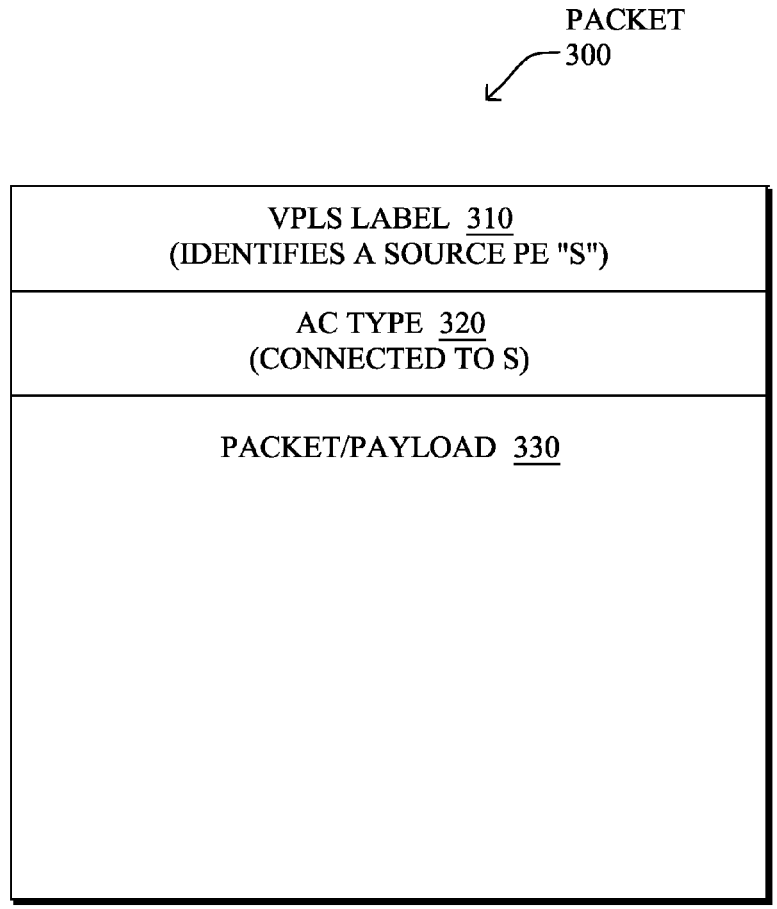
FIG. 3 illustrates an example packet.

FIG. 3 illustrates an example packet 300 that may be generated and transmitted within the network 100. For example, packet 300 may comprise a VC label ("VPLS label") 310, which may be used to identify a source site ("S") of the packet, while an attachment circuit (AC) type field 320 may be used to indicate whether the source S is a singlehomed or multihomed site. If field 320 indicates a multihomed site, it may also be used to indicate the MHID of the site. The remainder of the packet 300 may comprise the packet's payload 330, which may also comprise the packet's source and destination addresses (e.g., MAC addresses) as will be understood by those skilled in the art.

When a packet arrives on an AC from an active/active multihomed site, that is, a site where more than one AC is used actively for forwarding packets, the receiving edge device (e.g., a PE) may first compute a hash on the destination MAC address to determine whether it should process the packet or drop it. For example, if the multihomed site is connected to 'n' PEs, then each PE may perform a hash based on the number 'n' of other PEs in the active/active multihomed site:

$$x = \text{hash(destination address)} \% n \quad \text{Eq. 1}$$

Each edge device (PE) may also have an order, 'i,' in the range [0, n−1] derived from various factors shared among the edge devices of the network, such as device IDs or other IDs (e.g., VEIDs as understood by those skilled in the art exchanged through BGP signaling). Illustratively, the PE with a lowest ID may be assigned order i, a next lowest may be assigned i+1, and so on. (Notably, this order assignment may be scoped to each virtual forwarding instance, "VFI.")

After computing 'x' from the hash in equation 1 above, the PE may then check if x is equal to its order, i. If it is not, then the computed hash does not correspond to the receiving edge device, and the receiving edge device may drop the packet. However, in response to the computed hash corresponding to the receiving edge device, e.g., where x is equal to its order, i, then the receiving edge device may process the packet. Essentially, with this technique, one and only one PE processes packets with a particular destination address, ensuring deterministic selection. The technique also gives rise to the load balancing distribution desired to make all (or at least more than one) ACs active for an active/active mutlihomed site.

To process a packet, the receiving edge device may perform a MAC lookup operation against the learnt MAC table 249 based on the destination address. This lookup could result in one of the following actions:

a) there is no match, b) there is a match and it points to a virtual circuit (PW) to one other PE, or c) there is a match and it points to a set of PE virtual circuits (as described above).

In response to there being no match within the MAC table for the destination address, i.e., for (a), the receiving edge device may flood the packet to all the active virtual circuits (PWs) and other attachment circuits (ACs) of the edge device other than one on which the packet was received (e.g., following conventional "split horizon" rules, as may be appreciated by those skilled in the art). In response to there being a match is within the MAC table 249 for the destination address that points to a virtual circuit to a single other edge device, i.e., for (b), then the receiving edge device may send the packet on the virtual circuit (PW) to the other edge device, e.g., using conventional procedures.

In response to there being a match within the MAC table 249 for the destination address that points to a set of virtual circuits to corresponding other edge devices, i.e., for (c), the receiving edge device (PE) needs to determine to which PE virtual circuit (PW) to send the packet. Accordingly, the receiving edge device may compute a hash function on the source MAC address of the packet (i.e., a different address than the first hash in equation 1). For example, if there are 'm' PEs in the set that are connected to the multihomed site hosting the destination MAC address, then the receiving PE computes:

$$y = \text{hash(source address)} \% m \quad \text{Eq. 2}$$

Once again, there may be an implicit ordering of these 'm' destination PEs, which may be illustratively determined in the control plane, e.g., through BGP signaling. Depending on the value of 'y' computed in this hash (equation 2), one particular virtual circuit and corresponding particular edge device (one PE PW) may be selected for packet forwarding. Accordingly, the receiving edge device may send the packet on the selected particular virtual circuit to the corresponding particular edge device. In this manner, the "new" receiving edge device, that is, the edge device at the destination multihomed site receiving the sent packet on a core-facing circuit from the first receiving edge device, may compute its own hash to determine whether to drop or process the packet (useful for multicast/flooded packets that could arrive at both edge devices of a multihomed site). This hash is the same hash that would have been performed by the originating edge device in case (c) above, where the result was selection of the new edge device. For instance, in the example above, equation 2 was used in connection with a particular hashing function to select the new edge device. As such, the new (destination) edge device also uses equation 2 and its hash function in this example, or else the unicast packet singly transmitted to a sole destination edge device may be dropped, and lost.

The one or more embodiments above may be further understood based on the expanded illustrative description below and the accompanying figures.

In particular, as mentioned above, a single ID, such as a VEID (virtual edge identifier), may be allocated per PE. Also, a two-label stack may be used on VPLS PWs, such as packet 300 above. For instance, a top label 310 may be a classic VPLS label that identifies a source PE (S), and a next label 320 may identify an AC type connected to S. For example, a second label 320 of "20" may indicate that the packet is coming from a singled-homed AC connected to S, "21" may indicate that it is coming from a multihomed site with MHID=1 connected to S, "22" may indicate that the packet is from a multihomed site MHID=2 connected to S, etc. Note that in one or more alternative embodiments, only PWs coming from a Source PE which advertised at least one multihomed site need use this additional label 320. Also, in one or more further alternative embodiments, a subset of the second label 320 can identify the MHID (e.g., 6 bits) and another subset (e.g., 14 bits) can be used for enhanced load-balancing values to be used in the various hash functions, e.g., in addition to the MAC addresses.

Based on the topology in FIG. 1, each PE may maintain a path list including the various single- and multi-homed sites. For example, when a remote PE (e.g., PE3) learns via BGP that PE1 and PE10 are two PEs sharing a common MHID site 1, PE3 may create a path list comprising:

MHPL {PE1, PE10}
SHPL {PE1}
SHPL {PE10}

Figure 4:
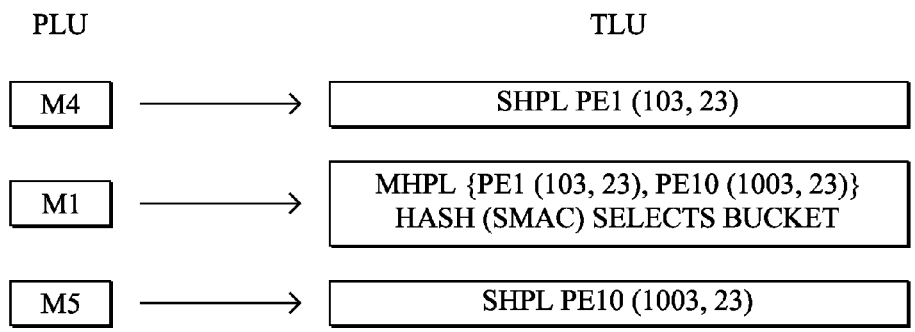
FIG. 4 illustrates an example data plane structure.

Whenever PE3 receives a frame with source MAC address (SMAC)=M4 from source PE1 with a second label=20, PE3 may add "M4" as a leaf pointing to SHPL PE1. Whenever PE3 receives a frame with SMAC=M1 from source PE1 with a second label=21, PE3 may add "M1" as a leaf pointing to MHPL {PE1, PE10}. FIG. 4 illustrates a dataplane structure and forwarding, showing pointer lookup (PLU) values and table lookup (TLU) values corresponding to various MAC addresses.

At forwarding time, PE30 and PE3 may both receive a packet destined to M1, and may each determine whether to drop or process the packet based on that destination MAC address (DMAC). Assuming PE3 is responsible for the DMAC M1, then PE3 will also select a single PE of the remote multihomed site (from PE1 or PE10) based on a hash on the SMAC. For instance, as described above, if hash (M3) =a first bucket, then the packet from M3 (SMAC) to M1 (DMAC) is sent by PE3 towards PE1, while a packet from M3' to M1 may result in hash (M3')=a second bucket, thus the flow from M3' to M1 is sent by PE3 towards PE10.

Generally, the "bucket" allocation may be determined by the VEID of each PE, e.g., the lowest VEID gets the first bucket, etc. For example, if the multihomed path list above is made of 2.2.2.2/32(VEID4) and 1.1.1.1/32(VEID7), then the path list may be illustratively implemented with 2.2.2.2/32/ VEID4 in the first bucket and 1.1.1.1/32/VEID7 in the second bucket. Note that this is merely an example ordering, and that other arrangements may be made that ensure deterministic MAC hashing across the network (e.g., decreasing order, etc.).

As mentioned, the two-label stack may be used to identify whether a learned MAC address should be associated with the source PE or with a multihomed path list. (MHPL). For instance, if M1 comes from a multihomed (MH) site 1 behind PE1, PE3 associates M1 with MHPL1 (PE1, PE10). Also, if M4 comes from a single-homed (SH) AC connected to PE1, then PE3 associates M4 with PE1 only.

While in an active/active mode, the consistency of the MAC tables 249 within a multihomed (MH) site should be ensured, else, for example, if flow (M3, M1) came via PE1 and flow (M3, M1') came via PE10, then the site 1 switches would become confused as to where M3 really is. In particular, a given remote MAC address (M3) should be "seen" behind a single PE from the viewpoint of a multihomed site (e.g., site 1). As described herein, therefore, this deterministic location may be performed by hashing on the MAC address. Specifically, the hashing occurs at multiple steps along the path, and depending on the step (ingress or egress PE), the hash is done on the source or destination MAC address, accordingly. Note that to ensure a deterministic hash, the hash function may be standardized or at least distributed to all participating edge devices in a network, such that all PEs can use the same hash function. In particular, in one embodiment, the hash function may take a single variable input, a MAC address, and no local input may be used which would make hash (M) different on different PEs. (Other inputs are possible, such as weight values, so long as the same values are used by all edge devices.)

According to techniques of one or more embodiments herein, when a packet is received from an SH AC, and if there is a MAC match, then the PE forwards the packet to the matched AC/remotePE. Otherwise, the PE may flood the packet on any local AC and to any remote PE. Note that any packet sent to a remote PE may also comprise a second VPLS label 320 (e.g., "20" above). If a packet is received from an MH AC, and if hash (DMAC) on the local MHPL does not select the local PE, the packet is dropped. Otherwise, the PE is responsible for the packet, and may process it by determining if there is a match in the MAC table. If so, then the packet may be forwarded to the matched AC or remote PE. Otherwise, if there is no match, the packet may again be flooded. (Note also that a second VPLS label 320 may again be used, but now identifying the MHID of the AC (e.g., "21" for MHID1).)

According to the techniques herein, a "match" in the MAC table may result in a single-homed path list (SHPL), where conventional forwarding to a single destination may take place, or an MHPL may result, at which time a second hash may be used to select the corresponding remote PE (a remote MHPL "bucket") based on hash (SMAC). For instance, an illustrative packet coming from a MH AC and matching a remote MHPL may consist of a packet from M1 to M3, which gets to PE1 from AC1. Hash (M3) confirms that PE1 should process this packet, and hash (M1) helps PE1 to select PE3 within MHPL3.

Figure 5:
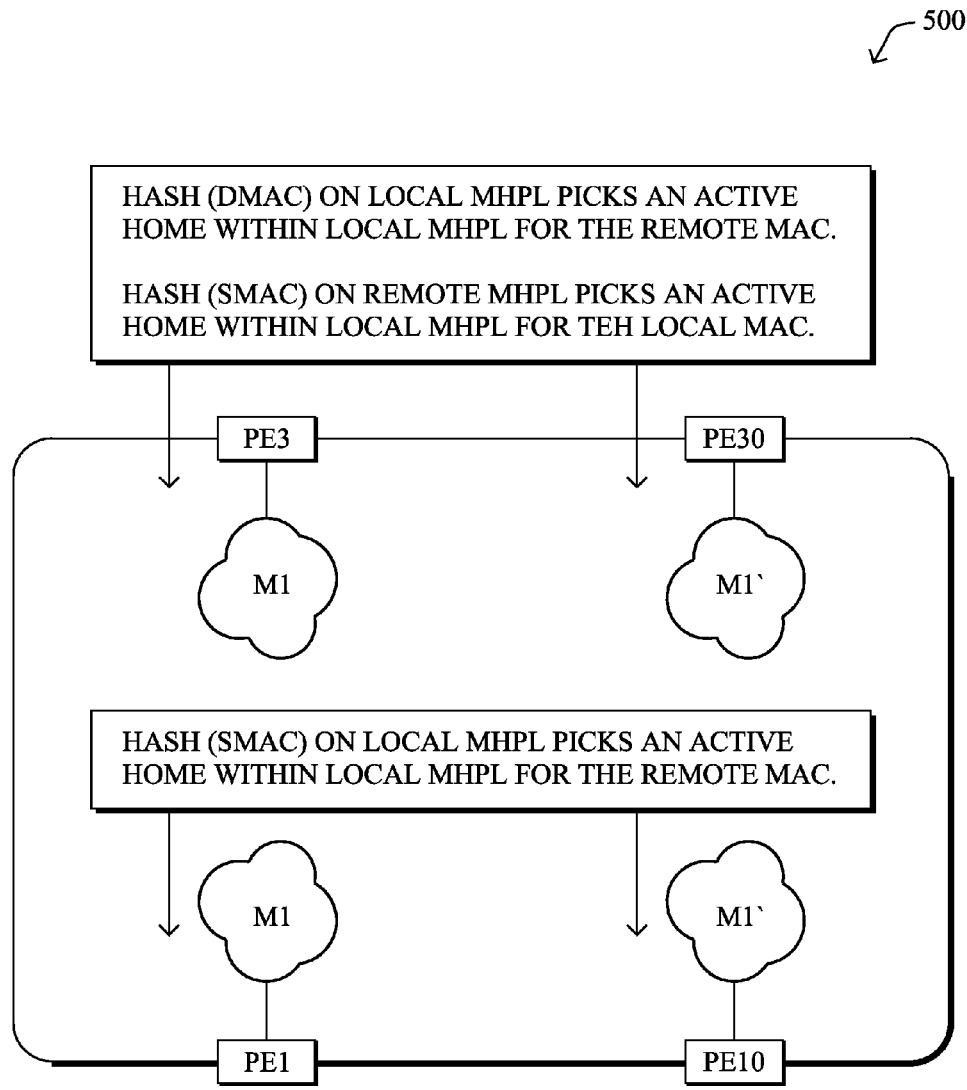
FIGS. 5-17 illustrate example packet passing based on hashing algorithms.
Figure 6:
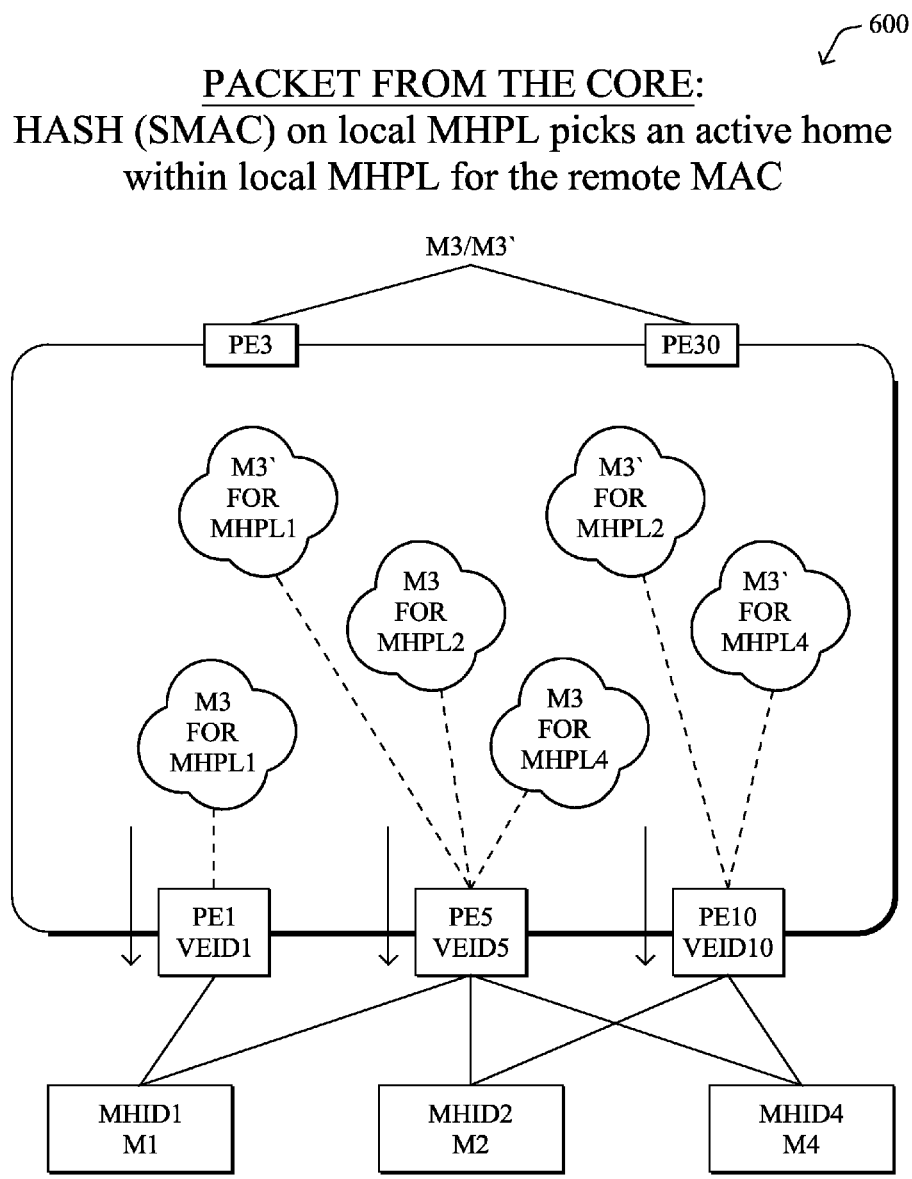

FIG. 5 illustrates a distributed algorithm to deterministically home a multi-homed MAC address to a single Primary PE as described herein. For instance, as shown, for ingress PEs (PE3 and PE30 in this directional example), hash (DMAC) performed on local MHPL picks an active home within the local MHPL for the remote MAC. Also, hash (SMAC) on remote MHPL may be used to pick an active home within a remote MHPL for the local MAC. On the receiving end, hash (SMAC) on local MHPL picks an is active home within local MHPL for the remote MAC. This is illustrated in more detail in FIGS. 6 and 7.

In particular, FIG. 6, for packets received from the core, an illustrative distribution of SMAC handling (M3 or M3') is shown on the "egress" PEs, namely PE1, PE10, and a new "PE5." As described above and as shown in FIG. 6, the techniques operate on a per MH-AC/MHPL basis, where hash (SMAC) on the local MHPL picks an active home within the local MHPL for the remote MAC address.

Figure 7:
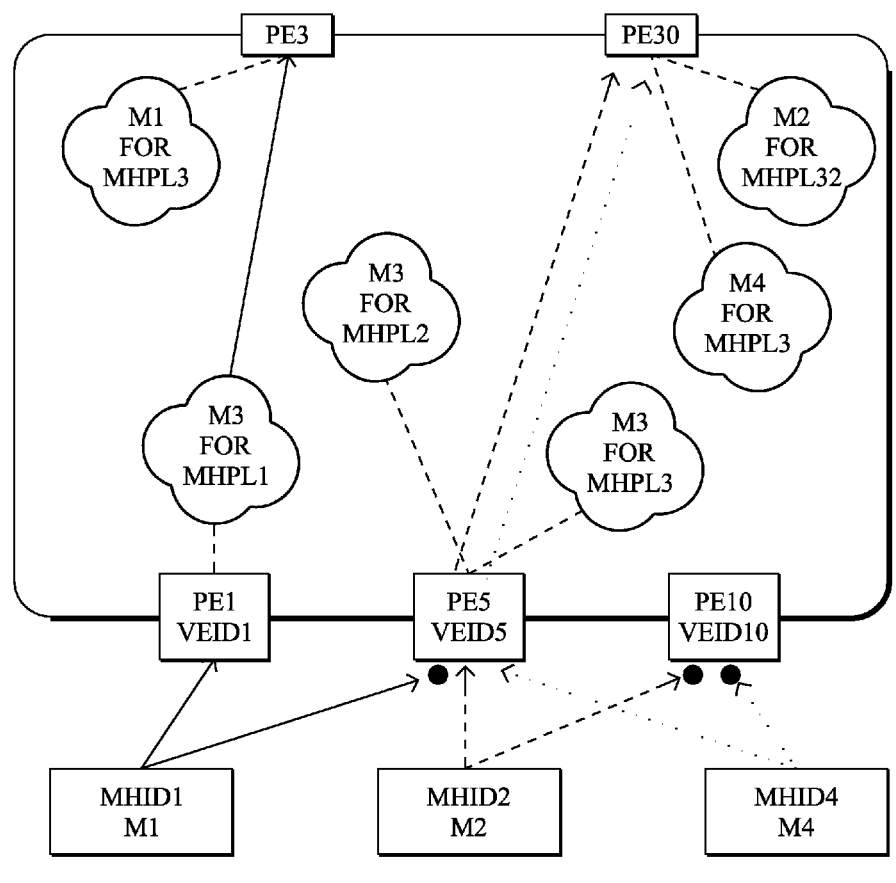

Also, FIG. 7 illustrates processing a packet received on an ingress PE (now PE1, PE5, and PE10) at a multihomed attachment circuit (MH AC). Specifically, as described herein, hash (DMAC) performed on a local MHPL picks an active home within a local MHPL for the remote MAC address, while hash (SMAC) performed on the remote MHPL picks an active home within remote MHPL for the local MAC address.

Figure 8:
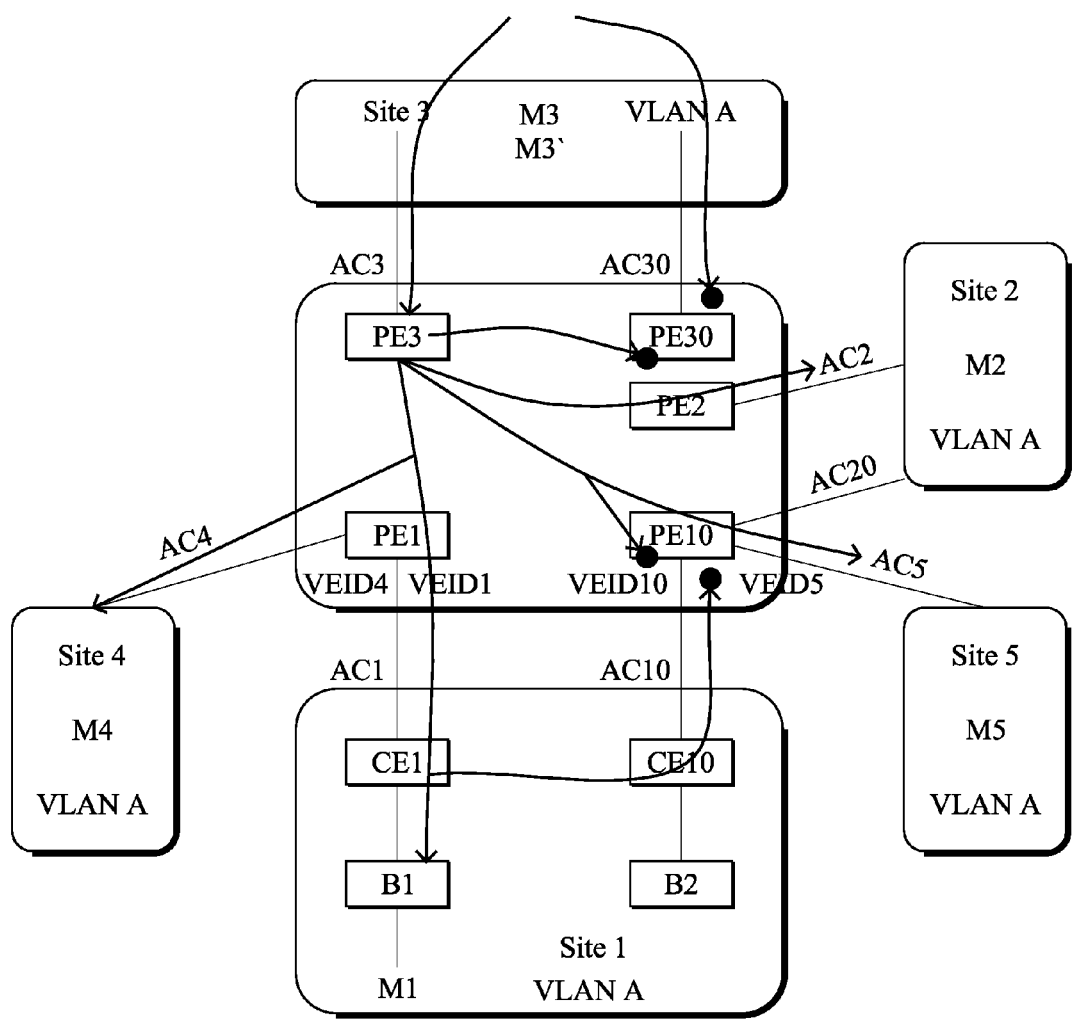

FIG. 8 illustrates an example (steady-state) representation of sending a packet/frame from M3 to M1, where there are no MAC table matches anywhere. In particular:

PE30 receives the packet from AC30. It drops it because hash (M1) does not select PE30. PE30 adds M3=>AC30.

PE3 receives the frame from AC3. It processes it because hash (M1) selects PE3. PE3 does not find a match. It floods on any single-homed AC in the VFI and towards the core: PE1(103-23), PE2(203-23), PE10(1003-23), PE30(3003-23). PE3 adds M3=>AC3.

PE1 matches 103 and looks up in its VFI. Without a match, it floods it on AC1 and AC4 (23< >MHID1 and hash (M3) selects PE1). PE1 adds M3=>MHPL[PE3, PE30].

PE2 matches 203 and looks up in its VFI. Without a match, it floods it on AC2. PE2 adds M3=>MHPL[PE3, PE30].

PE10 matches 1003 and looks up in its VFI. Without a match, it floods it only on AC5. It does not flood it on AC10 because hash (M3) does not select PE10. PE10 adds M3=>MHPL[PE3, PE30].

PE10 will receive the frame from AC10 (coming from the PE1's flood on AC1). PE10 will drop that frame either because it knows that M1 is below AC10 or anyway because hash (M1) selects PE1.

PE30 matches 3003 and looks up in its VFI. without a match, it floods it on any singled-home AC (none in this example). It does not flood it on AC30 because AC30's MHID=23. PE30 adds M3=>AC30.

In anticipation of a possible failure of AC1 at PE1, PE10 pre-installs in its forwarding information base (FIB) the following entry: (incoming label=10000=>xconnect onto AC10). Furthermore, it enables a watchdog on this entry such that as soon as a packet comes in with 10000, the PE10's route processor (RP) gets a priority interrupt. PE1 does the same for PE10.

Figure 9:
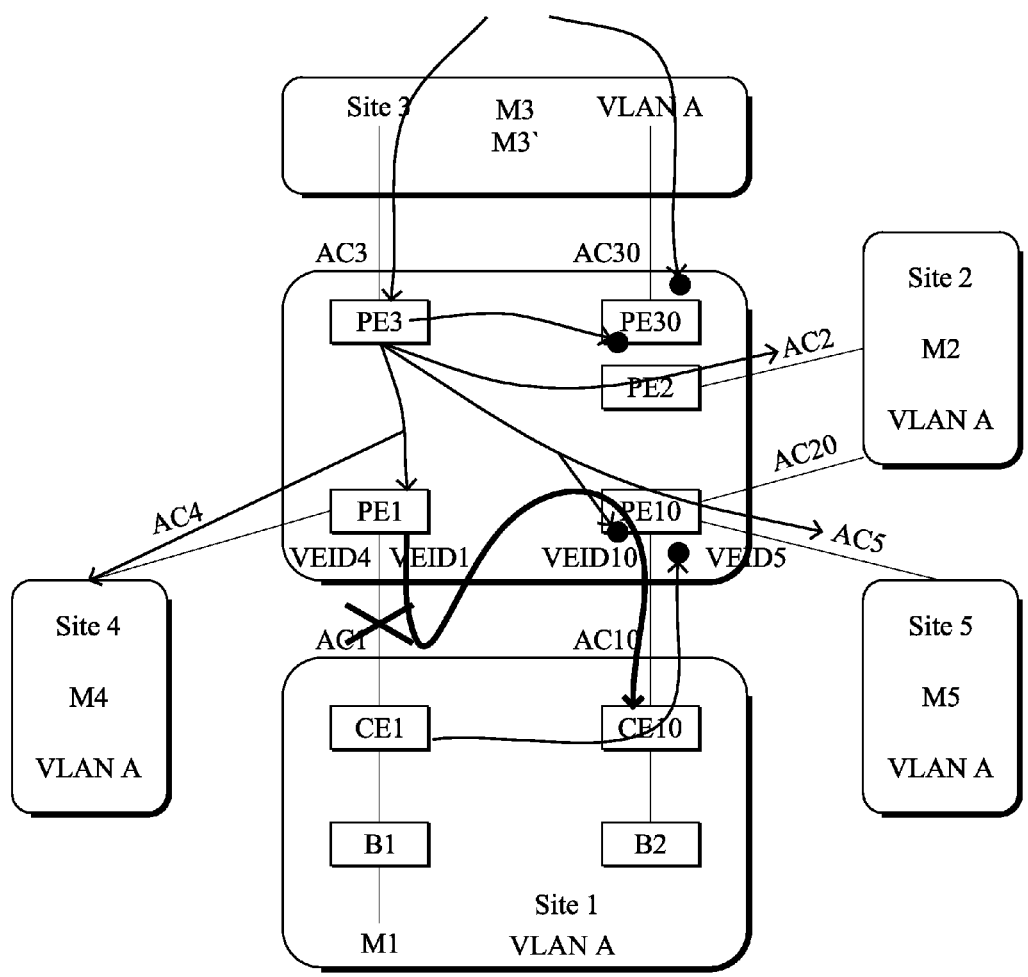

FIG. 9 illustrates an example passing of packets/frames in response to AC1 going down (failing) when passing packets from M3 to M1. In particular:

AC1 goes down: PE1 now sends any traffic it would have sent on AC1 towards PE10 with label 10000.

PE10 receives a first frame for label 10000: PE10 now treats any traffic from AC10 as if AC10 is SH(*). PE10 sends a TCN towards AC10 to trigger MAC re-learning with site1 and hence attract traffic that was previously going to PE1 (i.e., traffic to M3). For traffic from the VPLS core, PE10 still treats AC10 as a MH AC hence for example it would drop a frame (M3, M1) as Hash (M3) on MHPL1 selects PE1.

(*)PE10 sends to the core with the labels identifying his own VEID. Remote PE's do not really care if M1 is coming from PE1 or PE10 as they associate M1 with MHPL1 and pick the right PE based on Hash (SMAC).

PE1 sends a withdraw for MHPL1 NLRI: PE1 keeps protecting any traffic to AC1 via PE10/10000. PE1 starts timer T1 (e.g., 10 sec)

PE10 receives the MHPL1 NLRI withdraw from PE1: PE10 now considers AC10 as SH for both direction. PE10 starts a timer T2 (e.g., 10 sec)

Remote PE receives the MHPL1 NLRI withdraw from PE1: all leaf pointing to MHPL1 are rehomed to SHPL (PE10).

T2 times out at PE10: PE10 deletes the 10000 TFIB xconnect entry and withdraw this advertisement. PE10 withdraw NLRI MHID1.

T1 times out at PE1: PE1 deletes any data structure related to AC1 and hence stops protecting via PE10/10000.

Notably, in the above arrangement, there could be a transient blackhole if the remote PE receives the MHID 1 NLRI (network layer reachability information) withdraw notice from PE1 before PE10:

Remote PE receives the MHPL1 NLRI withdraw from PE1: all leaf nodes pointing to MHPL1 are rehomed to SHPL (PE10). For example, traffic (M3, M1) is now sent towards PE10. PE10 is not yet aware of the withdraw. PE10 still checks whether it is the right PE for MHPL for SMAC=M3. PE10 is not, hence it drops the frame. A blackhole is created until PE10 receives the withdraw.

PE10 receives the MHPL1 NLRI withdraw from PE1: PE10 now considers AC10 as SH for both directions. The blackhole stops as PE10 no longer checks Hash (SMAC) for the packet coming from the core.

Further, there may also be transient duplication of the packet if PE10 receives the MHID 1 NLRI withdraw from PE1 before the remote PE:

PE10 receives the MHPL1 NLRI withdraw from PE1: PE10 now considers AC10 as SH for both direction. PE10 forwards on AC10 any packet which matches a MAC address behind AC10 or which is unknown. The latter case may lead to duplication. Indeed, if PE3 does not know where M1 resides, PE3 floods (M3, M1) towards any remote SHPL, hence PE1 and PE10. PE1 receives it, validates hash (M3) and hence protects AC1 towards PE10/10000. PE10 does not validate hash (M3) and flood on AC10. Site receives the frame twice.

Remote PE receives the MHPL1 NLRI withdraw from PE1: all leaf nodes pointing to MHPL1 are rehomed to SHPL (PE10). Duplication for traffic unknown at the remote PE stops.

To alleviate the above two problems (blackholing and duplicates), PE1 may withdraw in two steps:

Step1: PE1 re-advertises NLRI MHID1 with a new attribute (e.g., "SynchSwitch" which contains a timestamp indicating when a remote PE should consider that PE1 is no longer connected to MHID1.)

Step 2: 10 seconds after step1, PE1 withdraws NLRI MHID1.

Remote PE behavior: Upon receiving a MHID NLRI with SynchSwitch attribute and timestamp T, schedule at time T the rehoming of all leaves pointing to MHPL1 towards SHPL (PE10).

PE10 behavior: Upon receiving a MHID NLRI with SynchSwitch attribute and timestamp T, schedule at time T the change of status of AC10: SH AC in "from-_core" direction, hence in both directions.

Figure 10:
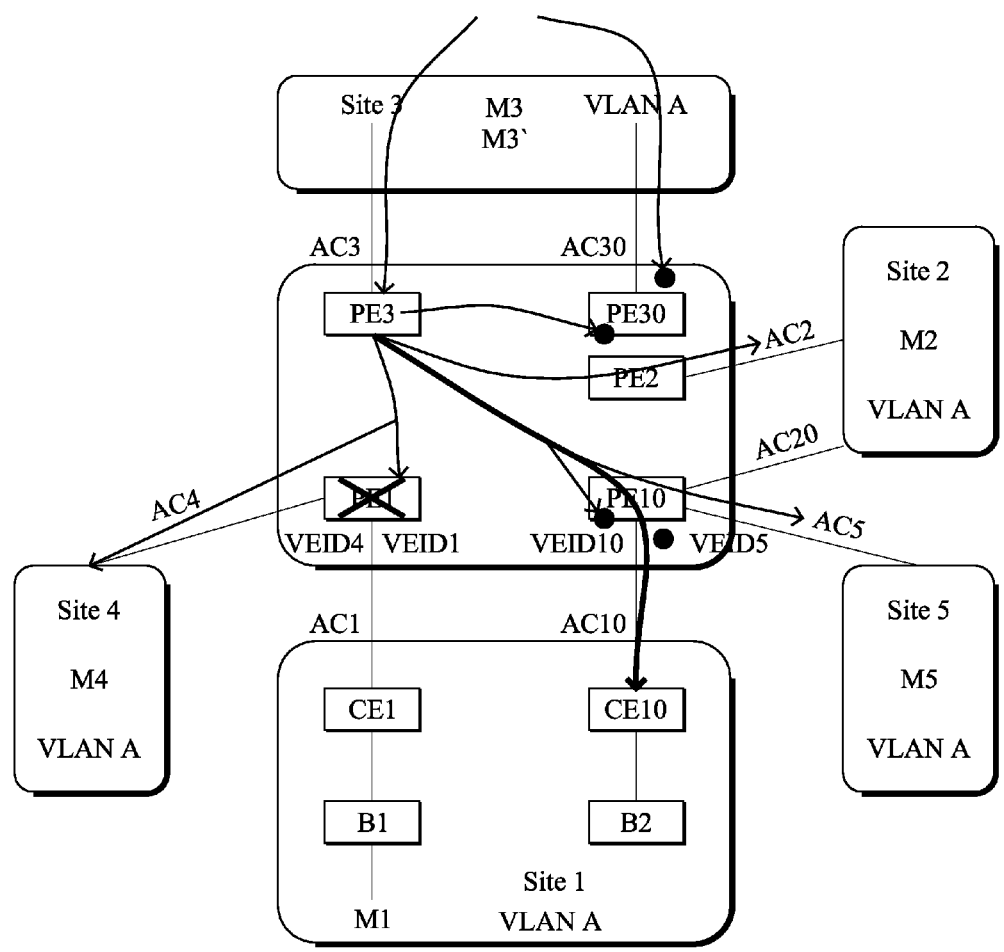

FIG. 10 illustrates an example scenario where an edge device, such as PE1 fails (goes down) when packets are forwarded from M3 to M1, and PE3 has a match:

PE1 goes down: any frame such that DMAC resides behind MHPL1 and hash (SMAC) designates PE1 is lost.

PE3's MH tracking notifies that PE1 is down: PE3 rehomes any leaf pointing to MHPL1 towards SHPL (PE10). This re-homing is MAC independent.

This avoids any re-learning on PE3.

Figure 11:
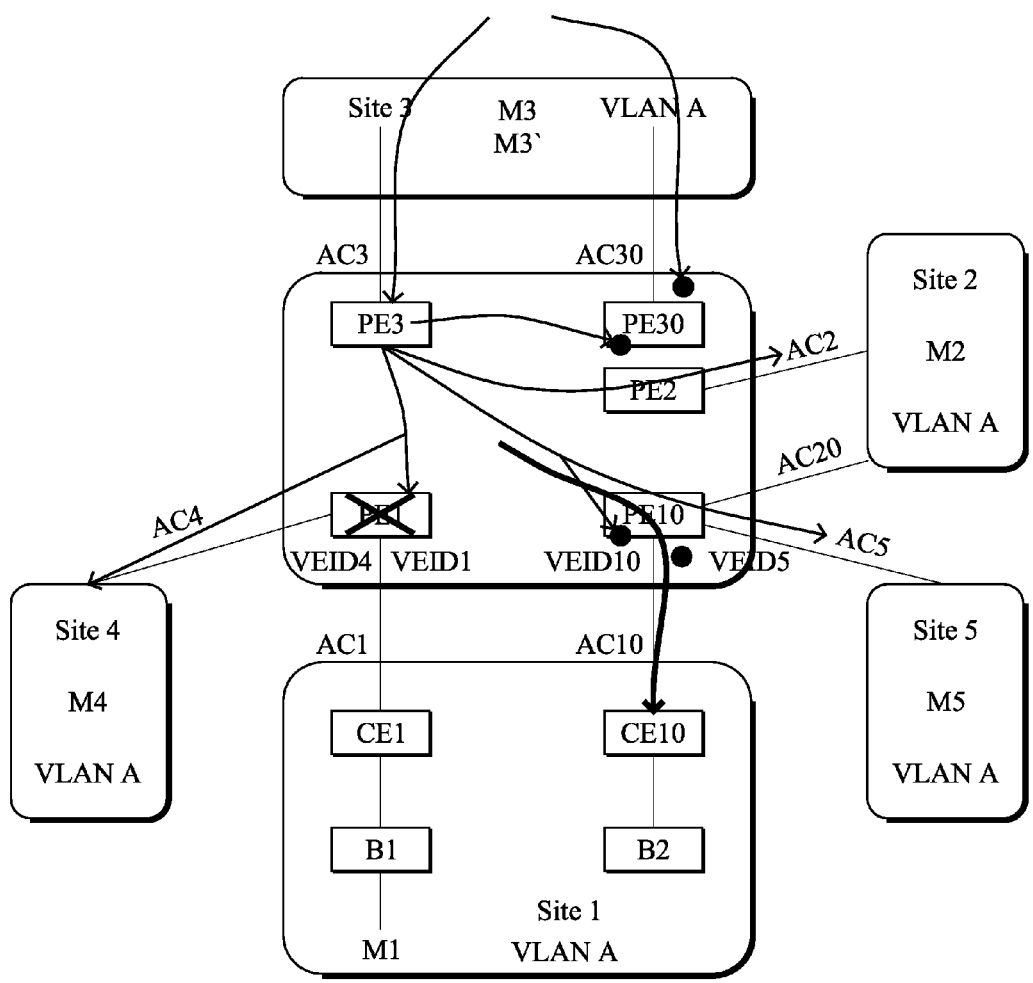

FIG. 11, on the other hand illustrates an example scenario where an edge device, such as PE1 fails (goes down) when packets are forwarded from M3 to M1, and PE3 does not have a match:

PE1 goes down: any frame such that DMAC resides behind MHPL1 and hash (SMAC) designates PE1 is lost.

PE10's MH tracking notifies that PE1 is down: PE10 handles AC10 as SH and hence accepts (M3, M1) packet flooded by PE3. The main convergence behavior occurs at the remote PE's. This behavior helps for unknown/broadcast traffic and if PE10 detects PE1 loss before the remote PEs.

FIGS. 12-16 illustrate example packet passing according to various possibilities of packet passing when transmitting a packet from M3 to M1 based on MAC table entries. For instance, while FIG. 8 illustrates the case where there is complete unawareness of the destination address, FIGS. 12-16 show instances where one or more edge devices are aware of the MAC address.

Figure 12:
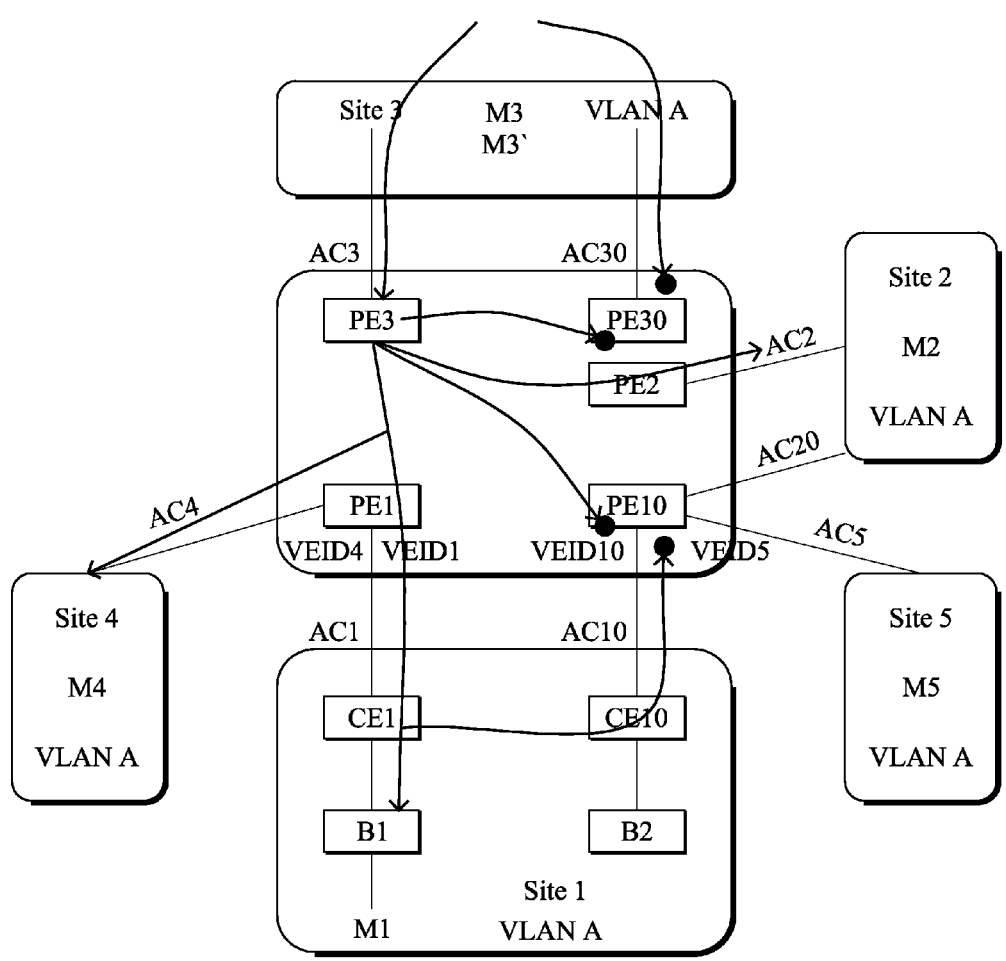

Illustratively, FIG. 12 shows the scenario where PE3 and PE1 do not have a matched address, PE10 does, and PE30 drops the packet based on an ingress hash as described above. Accordingly, PE3 and PE1 flood the packet, and PE10 drops the packet from proceeding to the multihomed site 1, and does not forward the packet to single homed site 5 as that is not the location of M1.

Figure 13:
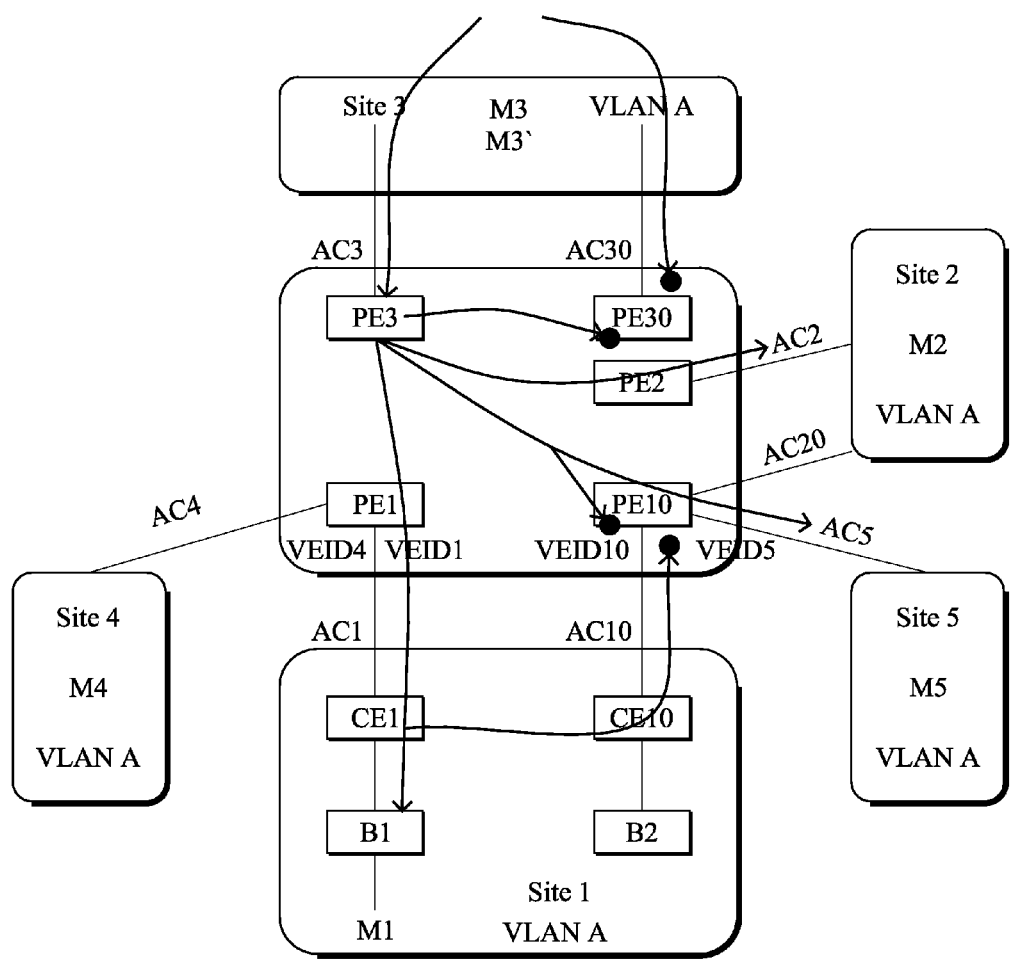

FIG. 13 illustrates the scenario where PE1 is aware of the DMAC address of the packet M1, but PE3 and PE10 do not. PE30, again, drops the packet. In this instance, PE1 forwards the packet directly into the multihomed site, and PE10 drops the multi-home bound packet, and floods to site 5.

Figure 14:
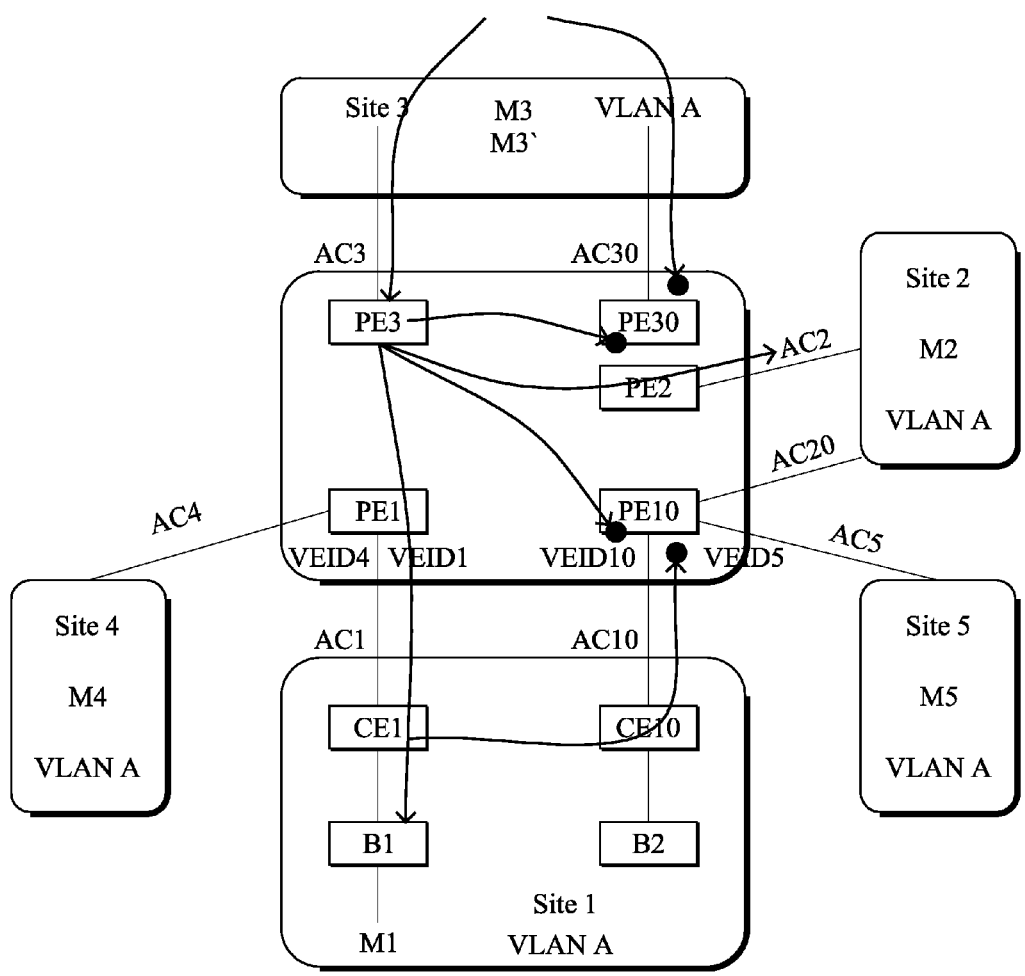

FIG. 14 illustrates the scenario where PE1 and PE10 are aware of the DMAC address of the packet M1, but PE3 does not. PE30, again, drops the packet, and PE1 and PE10 each operate as mentioned above when they have a match.

Figure 15:
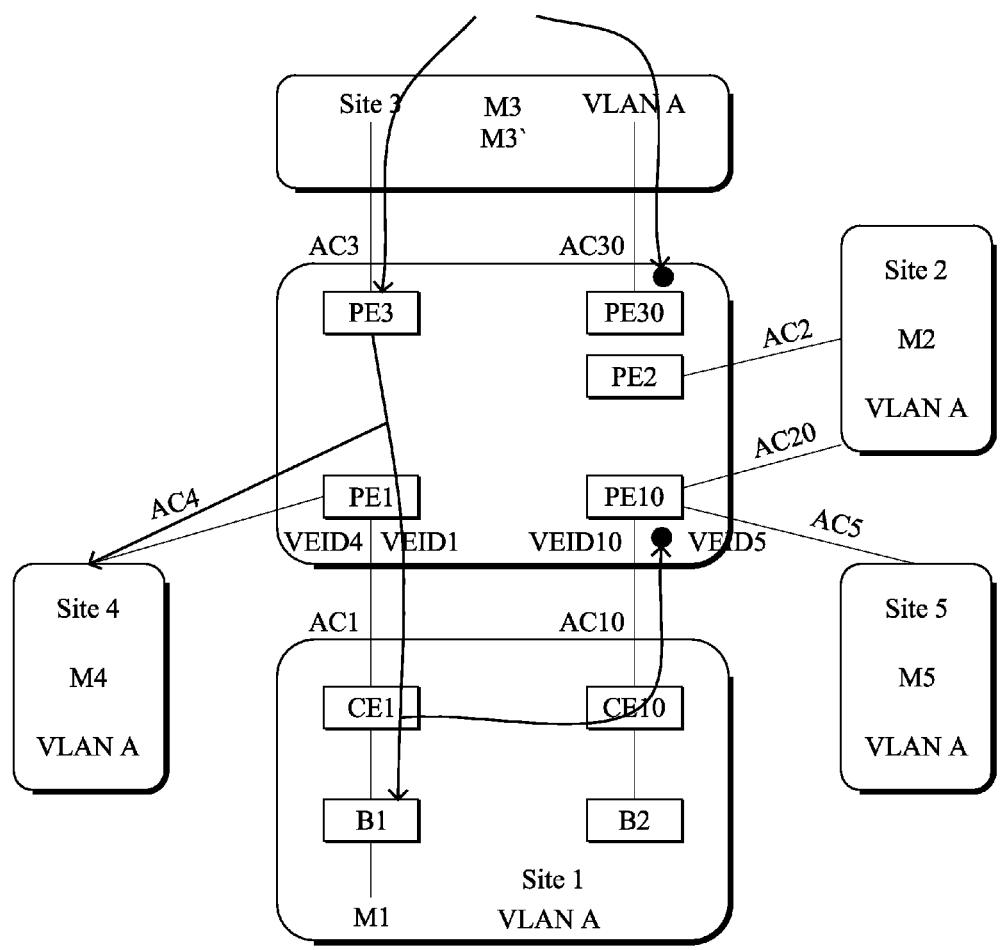

FIG. 15 illustrates the scenario where PE3 has a match, and PE1 does not. Accordingly, PE30 again drops the packet based on an ingress hash, and PE3 sends the packet directly to PE1. PE1 does not have an entry in MAC table 249 for M1, and thus floods to the single-homed site 4, and into the multihomed site 1 (knowing that it is responsible for egress based on the corresponding hash). If/When the packet returns to PE10, it is dropped based on the hashing functions described above.

Figure 16:
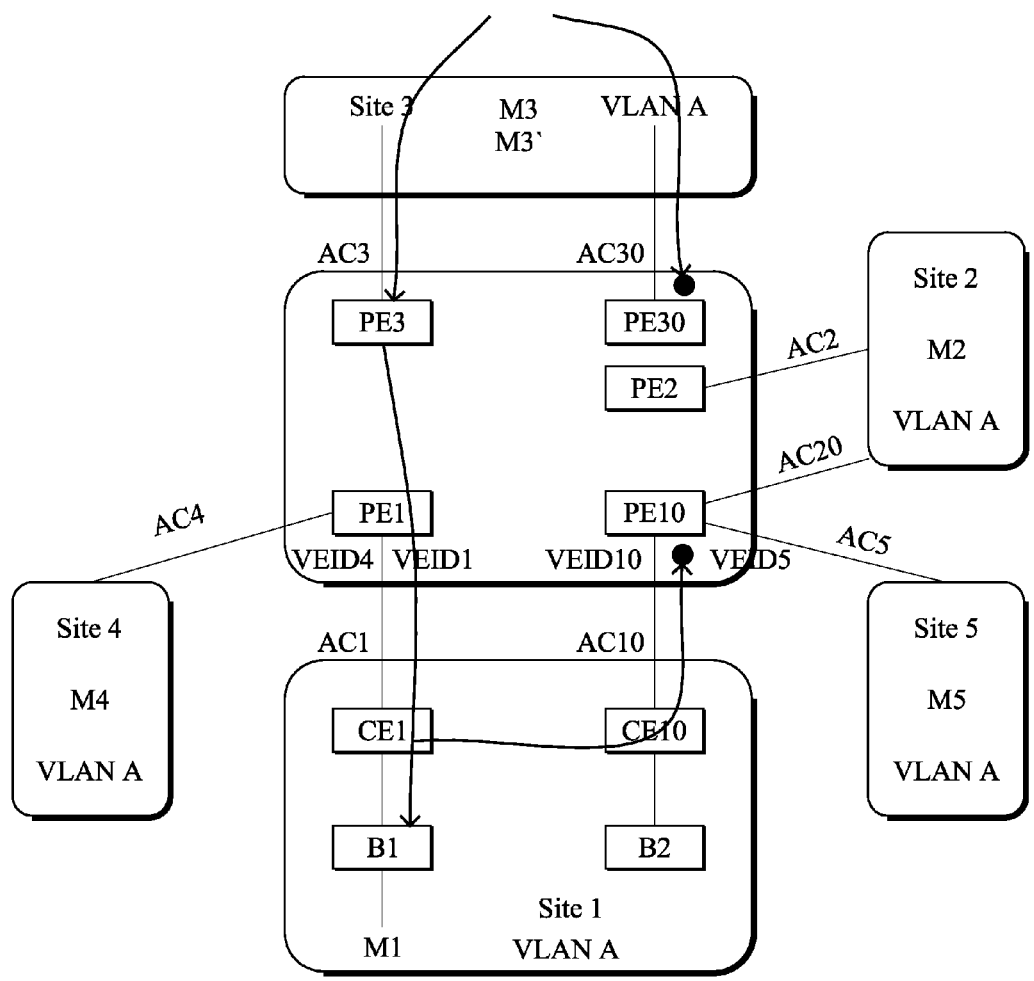

FIG. 16 illustrates the scenario where PE3 and PE1 know the destination address, M1. In this situation, during steady-state, the packet may be forwarded directly from PE3 to PE1, based on both hashing functions above, and any returned packet to PE10 is simply dropped. In more detail, as an example:

Hash (M1) selects PE3 hence all of site3 thinks that M1 is behind PE3, hence the frame (M3, M1) must get to PE3.
PE3 has "M1 is behind MHPL (PE1, PE10)".
PE3 sends the frame (M3, M1) to PE1/103-23 because hash (M3)=1st bucket.
PE1 matches 103 (identifies PE3) and then 23 (identifies MHPL{PE3, PE30}). PE1 looks up in its VFI. It finds a match onto MHAC1. As this is a MH AC, it confirms that (MHID3< >MHID1) and that Hash (M3) selects PE1. Both conditions are true and hence PE1 forwards onto AC1.
PE1 learns that M3 is behind MHPL {PE3, PE30}.

Note that conversely to what is shown in FIG. 16, assuming the same situation with M3' instead of M3:

Hash (M1) selects PE3 hence all of site3 thinks that M1 is behind PE3, hence the frame (M3', M1) must get to PE3.
PE3 has "M1 is behind MHPL (PE1, PE10)".
PE3 sends the frame (M3', M1) to PE10/1003-23 because hash (M3)=2nd bucket.
PE10 matches 1003 (identifies PE3) and then 23 (identifies MHPL{PE3, PE30}). PE10 looks up in its VFI. It finds a match onto MHAC10. As this is a MH AC, it confirms that (MHID3< >MHID1) and that Hash (M3') selects PE10. Both conditions are true and hence PE10 forwards onto AC10.
PE10 learns that M3' is behind MHPL {PE3, PE30}.

Figure 17:
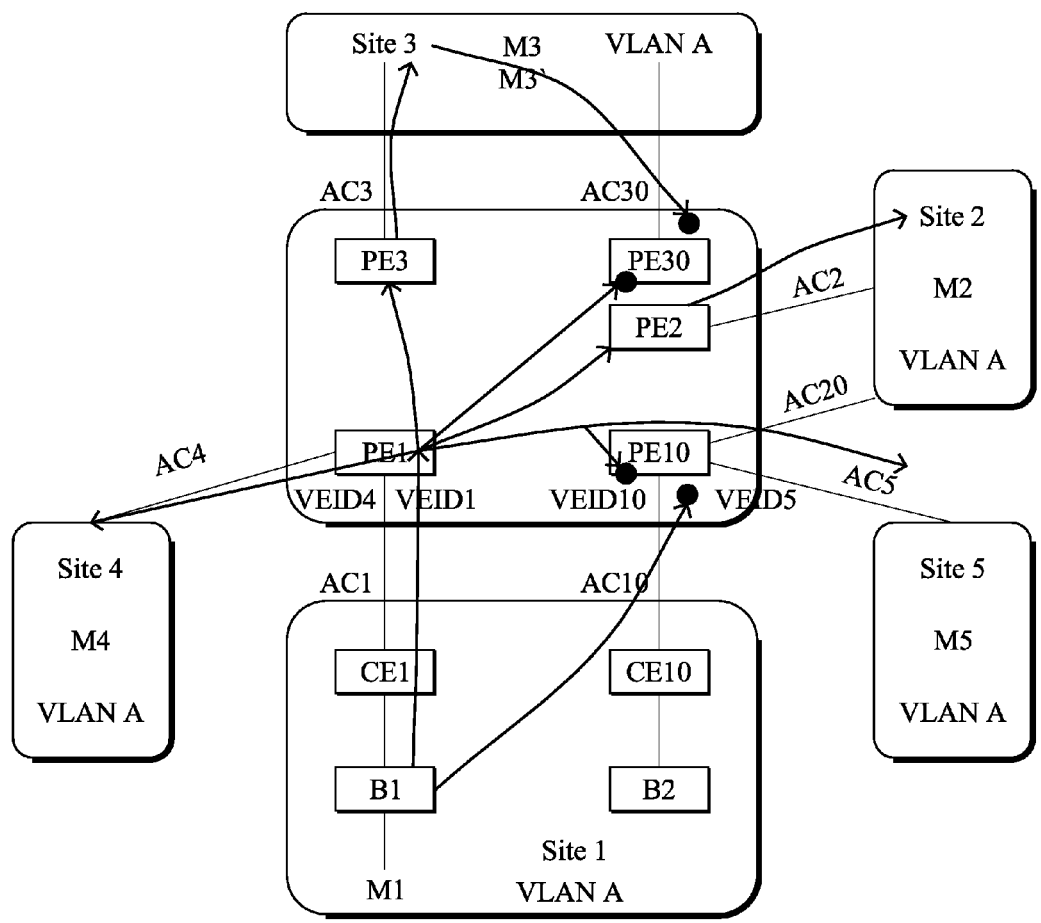

Lastly, FIG. 17 illustrates a reverse arrangement, where when sending a packet from M1 to M3, no device has a MAC table match for the destination address M3. In particular:

PE10 receives the frame from AC10. Hash (M3) does not select PE10. It drops the frame.
PE1 receives the frame from AC1. Hash (M3) selects PE1. PE1 does not find a match. It floods the frame on any single-homed AC in the VFI and towards any SHPL over the core: PE2/201-21, PE3/301-21, PE10/1001-21 and PE30/3001-21.
PE2 matches 201 and looks up in its VFI. No match, it floods it on AC2. PE2 learns that M1 is behind MHPL-ID1 {PE1, PE10}.
PE3 matches 301 and looks up in its VFI. No match. It floods it on AC3 because Hash (M1) selects PE3. If there was a single-homed AC, it would have flooded on it (whatever the hash result). PE3 learns that M1 is behind MHPL-ID1 {PE1, PE10}
PE10 matches1001. SHAC treatment: no match, flood on AC5 [note how the packet is flooded on AC5: it is based on the packet coming from the core, not on the basis of the packet coming from the MHAC (see first bullet above)]. MHAC treatment: second label=21 which is the same MHID as AC10, packet is not processed further for AC10.
PE30 matches 3001 and looks up in its VFI. No match. It does not flood it on AC30 because Hash (M1)=1st bucket. If there was a single-homed AC, it would have flooded on it.
In anticipation of a possible failure of AC3 at PE3, PE30 pre-installs in its FIB the following entry: (incoming label=30000=>xconnect onto AC30). Furthermore, it enables a watchdog on this entry such that as soon as a packet comes in with 30000, the PE30's RP gets a priority interrupt. PE3 does the same for PE30.

Figure 18A:
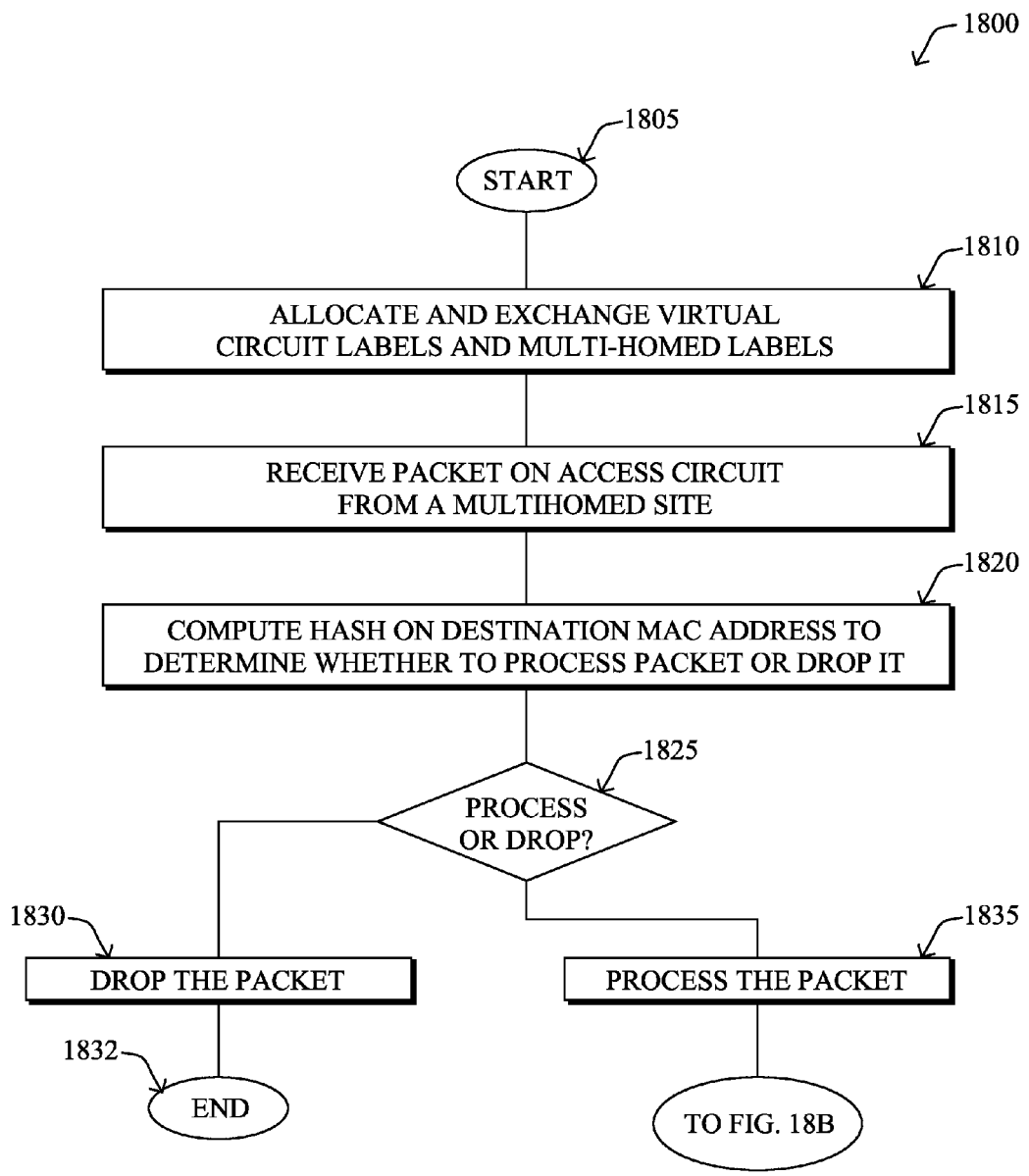
FIGS. 18A-B illustrate an example procedure for active/active multihoming.
Figure 18B:
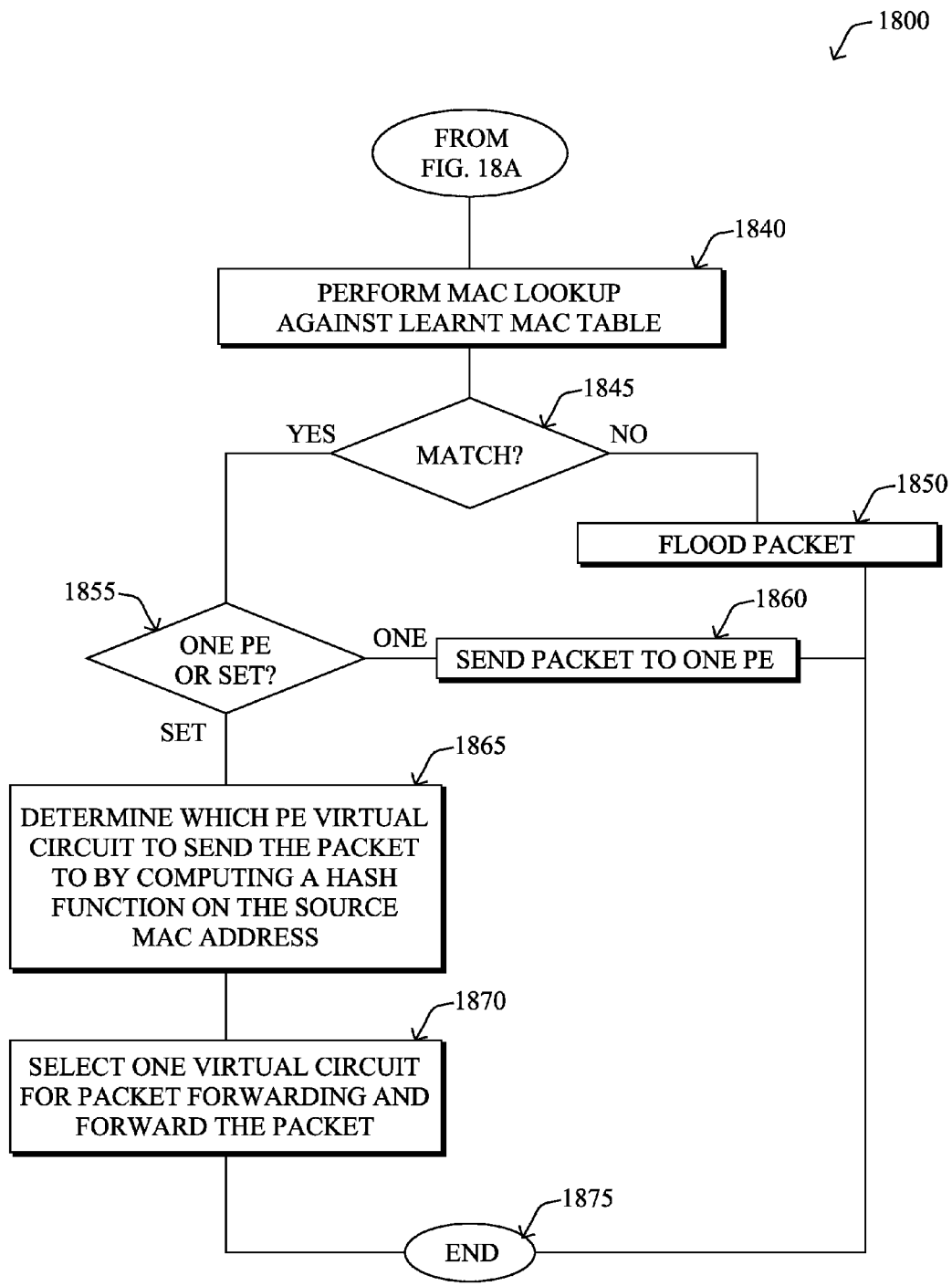

FIGS. 18A-B illustrate an example simplified procedure for active/active multihoming in accordance with one or more embodiments described herein. The procedure 1800 starts at step 1805 in FIG. 18A, and continues to step 1810, where virtual circuit labels and multihomed labels may be allocated and exchanged within the network as described above. In step 1815, then, an edge device may receive a packet on an access circuit from a multihomed site, and if so, then in step 1820 the receiving edge device may compute a hash on the destination MAC address to determine whether to process the packet or drop the packet. If in step 1825 it is determined that the hash does not correspond to the receiving edge device, then in step 1830 the packet is dropped, as described in detail above, and the procedure ends in step 1832. If, on the other hand, the hash does correspond to the receiving edge device in step 1825, then the procedure continues to step 1835 to process the packet, which continues to FIG. 18B.

Once it is determined that the packet is to be processed in FIG. 18A, in step 1840 of FIG. 18B the receiving edge device may correspondingly perform a MAC lookup against the learnt MAC table 249 as described above. If there is no match in step 1845 (not finding an entry), then in step 1850 the packet may be flooded as mentioned above. Conversely, if there is a match (an entry) in step 1845, then in step 1855 it may be further determined whether the entry relates to a single virtual circuit and edge device, or a set of virtual circuits and corresponding edge devices (e.g., PEs). When the entry points to a single edge device (PE), then in step 1860 the receiving edge device may send the packet to that single edge device, accordingly. However, if in step 1855 the entry points to a set of virtual circuits and edge devices, i.e., points to each edge device of a remote multihomed site, then in step 1865 another hash may be computed on the source MAC address of the packet to determine which particular virtual circuit (and thus edge device) to send the packet. Upon this determination, the receiving edge device may select the particular virtual circuit and "other" edge device, and may forward the packet, accordingly. The procedure 1800 ends, for each scenario above, in step 1875.

In closing, the novel techniques described herein allow for active/active multihoming in a computer network. By describing a mechanism to distribute traffic across generally all attachment circuits of a multihomed site, the novel techniques effectively load balance traffic (e.g., on a per-address basis) for multihomed sites in an active/active manner, while preventing layer 2 loops in the service provider network. In particular, the techniques described above provide a novel deterministic distributed algorithm using simple data plane techniques. Also, the dynamic aspects of one or more embodiments described herein (e.g., failure response, hash distribution, etc.) may alleviate the need for cumbersome and inefficient manual configuration.

While there have been shown and described illustrative embodiments that allow for active/active multihoming in a computer network, it is to be understood that various other adaptations and modifications may be made within the spirit and scope of the embodiments herein. For example, the embodiments have been shown and described herein using the destination address for a first (ingress) hash, and the source address for the second (egress) hash. However, the embodiments in their broader sense are not so limited, and may, in fact, be used with alternative arrangements, such as inverting the use of addresses, or other deterministic hash that can load balance (distribute) the traffic in a consistent manner. For instance, while the above hashes are generally based on a number of edge devices attached to a particular multihomed site (e.g., the ingress site or egress site, depending upon the hash), the hashes may be based on factors other than (or in addition to) the addresses. For example, even though the description above proposes the distribution by hashing on the MAC addresses, this may be extended by taking into account other variables as well, such as various network attributes, e.g. link bandwidths, current load, priority values or weighting values (e.g., 80% to a first device, 20% to another), etc. Also, while the description above relates generally to VPLS networks, other types of multihomed sites may utilize the techniques described herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken is only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at an edge device among a plurality of edge devices of a core network, a packet from a peripheral network having a plurality of active connections to the core network, the packet having a destination address and a source address;
   computing a first hash on one of the destination address or the source address of the each packet;
   determining that the computed first hash corresponds to the edge device;
   determining using a lookup operation in a media access control (MAC) table of the edge device based on the destination address that the destination address points to a plurality of virtual circuits that corresponds to other of the plurality of edge devices in the core network; and
   computing a second hash on one of the destination address or the source address whose hash was not yet computed;
   selecting one of the plurality of virtual circuits corresponding to a particular edge device from the plurality of edge devices based on the computed second hash, and
   sending the packet on the particular virtual circuit to the corresponding particular edge device.

2. The method as in claim 1, further comprising:
   performing a lookup operation into a media access control (MAC) table of the edge device based on the destination address; and
   in response to there being no match within the MAC table for the destination address, flooding the packet to all active virtual circuits and attachment circuits of the edge device other than one on which the packet was received.

3. The method as in claim 1, further comprises
   performing a lookup operation into a media access control (MAC) table of the edge device based on the destination address; and
   in response to there being a match within the MAC table for the destination address that points to a virtual circuit that leads to a single other edge device, sending the packet on the virtual circuit to the other edge device.

4. The method as in claim 1, wherein the computed second hash is based on a number of corresponding other edge devices.

5. The method as in claim 4, wherein the computed second hash is additionally based on one or more network attributes.

6. The method as in claim 1, wherein the computed first hash is based on a number of other edge devices in the peripheral network.

7. The method as in claim 1, wherein the computed first hash is based on one or more network attributes in addition to the destination address or the source address.

8. The method as in claim 1, wherein the computing the first hash on the destination address or the source address of each packet computes a hash on the destination address of each packet.

9. The method as in claim 1, wherein the packet is received on a core-facing circuit of the edge device from a second edge device, wherein computing the first hash comprises:
   computing the first hash based on a hash function that would have been performed by the second edge device, if the second edge device had a match within a media access control (MAC) table for the destination address of the packet, that pointed to a set of virtual circuits to other edge devices, where one of the other edge devices is the edge device.

10. The method as in claim 1, wherein the peripheral network is a virtual private local area network (LAN) services (VPLS) site.

11. An apparatus, comprising:
    one or more peripheral network-facing interfaces configured to communicate with a peripheral network that has a plurality of active connections to a core network;
    one or more core network-facing network interfaces configured to communicate with the core network;
    a processor coupled to the one or more peripheral network-facing interfaces and core network-facing network interfaces and configured to execute one or more processes; and a memory configured to store a process executable by the processor, the process when executed operable to:

receive a plurality of packets from the peripheral network, each packet having a destination address and a source address, compute a first hash on one of the destination address or the source address of each packet, determine whether the computed first hash corresponds to the apparatus, drop the packet in response to the computed first hash not corresponding to the apparatus, and process the packet in response to the computed first hash corresponding to the apparatus to forward the packet, wherein the process, when executed, to process the packet, further operable to:

perform a lookup operation in a MAC table based on the destination address; and in response to there being a match within the MAC table for the destination address that points to a plurality of virtual circuits that corresponds to a plurality of edge devices in the core network:

compute a second hash on one of the destination address or the source address whose hash was not yet computed, select one of the plurality of virtual circuits that corresponds to a particular edge device from the plurality of edge devices based on the computed second hash, and send the packet on the particular virtual circuit to the corresponding particular edge device.

12. The apparatus as in claim 11, wherein the plurality of active connections are attachment circuits and wherein the memory is further configured to store a media access control (MAC) table, and the process when executed is further operable to:

perform a lookup operation into the MAC table based on the destination address; and in response to there being no match within the MAC table for the destination address, flood the packet to all active interfaces of the network interfaces other than one on which the packet was received.

13. The apparatus as in claim 11, wherein the memory is further configured to store a media access control (MAC) table, and the process when executed is further operable to:

perform a lookup operation into the MAC table based on the destination address; and in response to there being a match within the MAC table for the destination address that points to a virtual circuit that leads to a single other edge device, send the packet on the virtual circuit to the other edge device.

14. The apparatus as in claim 11, wherein the process when executed is further operable to:

receive the packet on one of the core-facing network interfaces from a second edge device; and compute the first hash based on a hash function that would have been performed by the second edge device, if the second edge device had a match within a media access control (MAC) table for the destination address of the packet, that pointed to a set of virtual circuits to other edge devices, where one of the other edge devices is the apparatus.

15. A tangible, non-transitory computer-readable medium having software encoded thereon, the software when executed by a processor operable to:

receive, at an edge device among a plurality of edge devices of a core network, a plurality of packets from a peripheral network having a plurality of active connections to the core network, each packet having a destination address and a source address;

compute a first hash on one of the destination address or the source address of each packet;

determine whether the computed hash corresponds to the edge device;

drop the packet in response to the computed first hash not corresponding to the edge device; and process the packet in response to the computed first hash corresponding to the edge device to forward the packet, wherein the software, when executed, to process the packet, further operable to:

perform a lookup operation in a media access control (MAC) table of the edge device based on the destination address; and in response to there being a match within the MAC table for the destination address that points to a plurality of virtual circuits that corresponds to other of the plurality of edge devices in the core network:

compute a second hash on one of the destination address and the source addresses whose hash was not yet computed;

select one of the plurality of virtual circuits that corresponds to a particular edge device from the plurality of edge devices based on the computed second hash; and send the packet on the particular virtual circuit to the corresponding particular edge device.

16. The tangible, non-transitory computer-readable medium as in claim 15, wherein the software that when executed is operable to process the packet comprises software that when executed is operable to:

perform a lookup operation into a media access control (MAC) table of the edge device based on the destination address; and in response to there being no match within the MAC table for the destination address, flood the packet to all active virtual circuits and attachment circuits of the edge device other than one on which the packet was received.

17. The tangible, non-transitory computer-readable medium as in claim 15, wherein the software that when executed is operable to process the packet comprises software that when executed is operable to:

perform a lookup operation into a media access control (MAC) table of the edge device based on the destination address; and in response to there being a match within the MAC table for the destination address that points to a virtual circuit that leads to a single other edge device, send the packet on the virtual circuit to the other edge device.

18. The tangible, non-transitory computer-readable medium as in claim 15, wherein the packet is received on a core-facing circuit of the receiving edge device from a second edge device, wherein the software that when executed is operable to compute the first hash is further operable to:

compute the first hash based on a hash function that would have been performed by the second edge device for the packet in response to the second edge device having a match within a media access control (MAC) table for the destination address of the packet that pointed to a set of virtual circuits to corresponding other edge devices, where one of the other edge devices is the edge device.

* * * * *